(12) United States Patent
Sadwick

(10) Patent No.: US 8,987,997 B2
(45) Date of Patent: Mar. 24, 2015

(54) DIMMING DRIVER WITH STEALER SWITCH

(71) Applicant: Laurence P. Sadwick, Salt Lake City, UT (US)

(72) Inventor: Laurence P. Sadwick, Salt Lake City, UT (US)

(73) Assignee: InnoSys, Inc., Salt Lake City, UT (US)

( * ) Notice: Subject to any disclaimer, the term of this patent is extended or adjusted under 35 U.S.C. 154(b) by 0 days.

(21) Appl. No.: 13/769,378

(22) Filed: Feb. 17, 2013

(65) Prior Publication Data

US 2013/0214695 A1     Aug. 22, 2013

Related U.S. Application Data

(60) Provisional application No. 61/600,312, filed on Feb. 17, 2012.

(51) Int. Cl.
*H05B 37/02*     (2006.01)
*H05B 33/08*     (2006.01)

(52) U.S. Cl.
CPC ............ *H05B 33/08* (2013.01); *H05B 33/0815* (2013.01); *Y02B 20/346* (2013.01)
USPC .......................................... 315/224; 315/287

(58) Field of Classification Search
CPC .... H05B 37/02; H05B 33/08; H05B 33/0803; H05B 33/0815; H05B 33/0896
USPC ....................... 315/209 R, 224, 246, 287, 291
See application file for complete search history.

(56) References Cited

U.S. PATENT DOCUMENTS

| | | |
|---|---|---|
| 4,629,944 A | 12/1986 | Maytum et al. |
| 4,914,356 A | 4/1990 | Cockram |
| 5,404,080 A | 4/1995 | Quazi |
| 5,463,280 A | 10/1995 | Johnson |
| 5,581,158 A | 12/1996 | Quazi |
| 5,734,564 A | 3/1998 | Brkovic |
| 6,081,075 A | 6/2000 | Littlefield |
| 6,295,217 B1 | 9/2001 | Yang et al. |
| 6,392,368 B1 | 5/2002 | Deller et al. |
| 6,462,485 B1 | 10/2002 | Kimball |
| 6,577,512 B2 | 6/2003 | Tripathi et al. |
| 6,853,151 B2 | 2/2005 | Leong |
| 6,927,989 B2 | 8/2005 | Fukumoto |
| 6,936,968 B2 | 8/2005 | Cross et al. |
| 6,965,205 B2 | 11/2005 | Piepgras et al. |
| 7,151,246 B2 | 12/2006 | Fein et al. |
| 7,151,345 B2 | 12/2006 | Sanchez |

(Continued)

FOREIGN PATENT DOCUMENTS

| | | |
|---|---|---|
| WO | WO03/096761 A1 | 11/2003 |
| WO | WO2008/137460 A2 | 11/2008 |

OTHER PUBLICATIONS

Supplemental European Search Report re EP10762548, Dec. 18, 2012.

(Continued)

*Primary Examiner* — Thuy Vinh Tran
(74) *Attorney, Agent, or Firm* — Hamilton DeSanctis & Cha

(57) ABSTRACT

An apparatus for supplying power includes a power input, an output driver operable to transfer power from the power input to a load output, an output driver control switch operable to control a current from the power input through the output driver, a pulse generator operable to generate a pulse signal to control the output driver control switch, and a stealer switch operable to disable the pulse signal.

20 Claims, 4 Drawing Sheets

(56) References Cited

U.S. PATENT DOCUMENTS

| | | |
|---|---|---|
| 7,161,313 B2 | 1/2007 | Piepgras et al. |
| 7,178,941 B2 | 2/2007 | Roberge et al. |
| 7,183,724 B2 | 2/2007 | Ball |
| 7,202,613 B2 | 4/2007 | Morgan et al. |
| 7,233,115 B2 | 6/2007 | Lys |
| 7,256,554 B2 | 8/2007 | Lys |
| 7,262,559 B2 * | 8/2007 | Tripathi et al. ............... 315/291 |
| 7,276,861 B1 | 10/2007 | Shteynberg |
| 7,295,176 B2 | 11/2007 | Yang |
| 7,298,095 B2 | 11/2007 | Nukisato et al. |
| 7,358,706 B2 | 4/2008 | Lys |
| 7,378,805 B2 | 5/2008 | Oh et al. |
| 7,441,922 B2 | 10/2008 | Huang et al. |
| 7,459,864 B2 | 12/2008 | Lys |
| 7,478,941 B2 | 1/2009 | Wu et al. |
| 7,511,437 B2 | 3/2009 | Lys et al. |
| 7,557,519 B2 | 7/2009 | Kranz |
| 7,759,881 B1 | 7/2010 | Melanson |
| 7,880,404 B2 * | 2/2011 | Deng et al. .................... 315/291 |
| 7,898,187 B1 * | 3/2011 | Mei et al. ...................... 315/247 |
| 8,022,634 B2 | 9/2011 | Greenfeld |
| 8,115,421 B2 | 2/2012 | Mishima et al. |
| 8,148,907 B2 | 4/2012 | Sadwick |
| 8,203,445 B2 | 6/2012 | Recker et al. |
| 8,405,319 B2 | 3/2013 | Sadwick |
| 8,441,204 B2 * | 5/2013 | Otake et al. ................... 315/291 |
| 2003/0085669 A1 | 5/2003 | Pak |
| 2006/0170373 A1 | 8/2006 | Yang |
| 2006/0220595 A1 | 10/2006 | Lu |
| 2007/0025119 A1 | 2/2007 | Chang-Jien |
| 2007/0114986 A1 | 5/2007 | Yoshii |
| 2007/0228999 A1 | 10/2007 | Kit |
| 2008/0067953 A1 | 3/2008 | Kranz |
| 2008/0081423 A1 | 4/2008 | Sadwick et al. |
| 2008/0094837 A1 | 4/2008 | Dobbins et al. |
| 2008/0284346 A1 | 11/2008 | Lee |
| 2008/0290814 A1 | 11/2008 | Leong |
| 2009/0009994 A1 | 1/2009 | Wu et al. |
| 2010/0026208 A1 | 2/2010 | Shteynberg |
| 2010/0033095 A1 | 2/2010 | Sadwick |
| 2010/0060204 A1 | 3/2010 | Ohtake et al. |
| 2010/0176743 A1 | 7/2010 | Lee et al. |
| 2010/0194296 A1 | 8/2010 | Park |
| 2010/0244696 A1 | 9/2010 | Kim |
| 2011/0169426 A1 | 7/2011 | Sadwick |
| 2011/0260619 A1 | 10/2011 | Sadwick |
| 2012/0043893 A1 | 2/2012 | Sadwick |
| 2012/0153869 A1 | 6/2012 | Sadwick |
| 2012/0299500 A1 | 11/2012 | Sadwick |

OTHER PUBLICATIONS

U.S. Appl. No. 13/708,953, filed Dec. 8, 2012, Laurence P. Sadwick, Unpublished.

U.S. Appl. No. 13/674,072, filed Nov. 11, 2012, Laurence P. Sadwick, Unpublished.

U.S. Appl. No. 13/760,911, filed Feb. 6, 2013, Laurence P. Sadwick, Unpublished.

U.S. Appl. No. 13/098,768, filed May 2, 2011, Laurence P. Sadwick, Unpublished.

U.S. Appl. No. 13/073,959, filed Mar. 28, 2011, Laurence P. Sadwick, Unpublished.

U.S. Appl. No. 13/301,457, filed Nov. 21, 2011, Laurence P. Sadwick, Unpublished.

Written opinion of the international searching authority re PCT/US2010/030644, Oct. 20, 2011.

* cited by examiner

US 8,987,997 B2

DIMMING DRIVER WITH STEALER SWITCH

BACKGROUND

Electricity is generated and distributed in alternating current (AC) form, wherein the voltage varies sinusoidally between a positive and a negative value. However, many electrical devices require a direct current (DC) supply of electricity having a constant voltage level, or at least a supply that remains positive even if the level is allowed to vary to some extent. For example, light emitting diodes (LEDs) and similar devices such as organic light emitting diodes (OLEDs) are being increasingly considered for use as light sources in residential, commercial and municipal applications. However, in general, unlike incandescent light sources, LEDs and OLEDs cannot be powered directly from an AC power supply unless, for example, the LEDs are configured in some back to back formation. Electrical current flows through an individual LED easily in only one direction, and if a negative voltage which exceeds the reverse breakdown voltage of the LED is applied, the LED can be damaged or destroyed. Furthermore, the standard, nominal residential voltage level is typically something like 120 V or 240 V AC, both of which are often higher than may be desired for a high efficiency LED light. In addition, commercial and municipal voltage levels can be significantly above 240 V AC and up to or above 480 VAC. Some conversion of the available power may therefore be necessary or highly desired with loads such as an LED light.

In one type of commonly used power supply for loads such as an LED, an incoming AC voltage is connected to the load and current is drawn only during certain portions of the sinusoidal waveform. For example, a fraction of each half cycle of the waveform may be used by connecting the incoming AC voltage to the load each time the incoming voltage rises to a predetermined level or reaches a predetermined phase and by disconnecting the incoming AC voltage from the load each time the incoming voltage again falls to zero or capacitors that are used in the power supply circuit may charge only near the peak of, for example, the rectified AC input voltage. In this manner, a positive but reduced voltage may be provided to the load. This type of conversion scheme is often controlled so that a constant current is provided to the load even if the incoming AC voltage varies. However, if this type of power supply, and, often, other types of power supplies, with current control is used in an LED light fixture or lamp, a conventional dimmer is often ineffective. For many LED power supplies, the power supply will attempt to maintain the constant current through the LED despite a drop in the incoming voltage by increasing the on-time during each cycle of the incoming AC wave.

SUMMARY

The driver disclosed herein provides power for lights such as LEDs of any type and other loads, using pulse control of a switch to adjust load current and/or voltage. A stealer switch is provided to rapidly turn off the switch.

This summary provides only a general outline of some particular embodiments. Many other objects, features, advantages and other embodiments will become more fully apparent from the following detailed description.

BRIEF DESCRIPTION OF THE DRAWINGS

A further understanding of the various embodiments may be realized by reference to the figures which are described in remaining portions of the specification. In the figures, like reference numerals may be used throughout several drawings to refer to similar components.

DESCRIPTION

The lighting driver disclosed herein provides power for lights such as LEDs of any type and other loads. The lighting driver may be dimmed or otherwise controlled externally, for example by controlling a line voltage supplying the lighting driver, or internally, for example using a wireless controller to command internal dimming circuits, etc. The current and/or voltage to a load is adjusted using a switch to pass or block input current, controlled by a variable pulse signal. A stealer switch is provided to rapidly turn off the switch to block the input current, with the stealer switch controlled in some embodiments by an inverted version of the variable pulse signal.

The dimming driver with stealer switch may include driver circuits and applications such as the various dimmable LED drivers and their variations disclosed in U.S. patent application Ser. No. 12/422,258, filed Apr. 11, 2009 for a "Dimmable Power Supply", and in U.S. patent application Ser. No. 12/776,409, filed May 9, 2010 for a "LED Lamp with Remote Control", which are incorporated herein by reference for all purposes.

Figure 1:
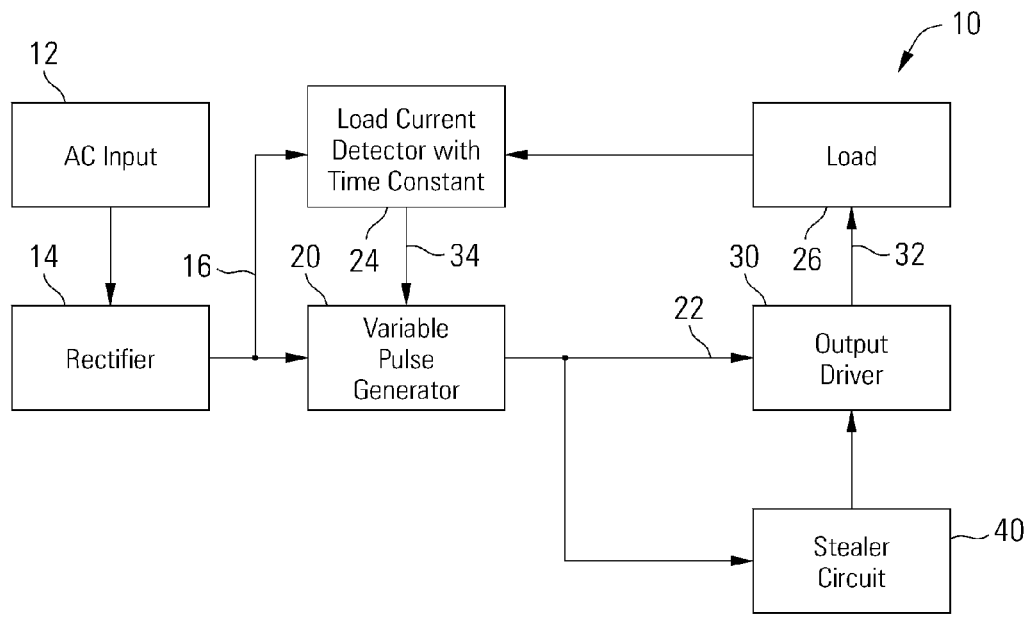
FIG. 1 depicts a block diagram of a dimming driver with stealer switch in accordance with some embodiments of the invention.

Turning to FIG. 1, a block diagram of a dimming driver with stealer switch 10 is illustrated in accordance with various embodiments of the invention. The dimming driver with stealer switch 10 is powered in some embodiments by an AC input 12, for example by a 50 or 60 Hz sinusoidal waveform of 120 V or 240 V RMS or higher such as that supplied to commercial and residential facilities by municipal electric power companies. It is important to note, however, that the dimming driver with stealer switch 10 is not limited to any particular power input. Furthermore, the voltage applied to the AC input 12 may be externally controlled, such as in an external dimmer (not shown) that reduces the voltage. The AC input 12 is connected to a rectifier 14 to rectify and invert any negative voltage component from the AC input 12. Although the rectifier 14 may filter and smooth the power output 16 if desired to produce a DC signal, this is not necessary and the power output 16 may be a series of rectified half sinusoidal waves at a frequency double that at the AC input 12, for example 100 or 120 Hz. A variable pulse generator 20 is powered by the power output 16 from the AC input 12 and rectifier 14 to generate a train of pulses at output 22. The pulse width of the pulses in output 22 is controlled in the variable pulse generator 22 by load current detector 24 based on load current levels. Various implementations of pulse width control including pulse width modulation (PWM) by frequency, analog and/or digital control may be used to realize the pulse width control. Other features such as soft start, delayed start, instant on operation, etc. may also be included if deemed desirable, needed, and/or useful. Output driver 30 produces a current through the load 26, with the current levels adjusted by the pulse width at the output 22 variable pulse generator 22. The load current is monitored by the load current detector 24 and may also be monitored by a master load current detector sensor. Such a sensor may be, but is not limited to, a sense resistor, a sense transformer, a winding on a transformer or inductor, sensing via passive and/or active components, etc.

A stealer circuit 40 is provided to increase the speed at which the output driver 30 changes state or turns on and off, passing current from power output 16 to the load 26.

Figure 2:
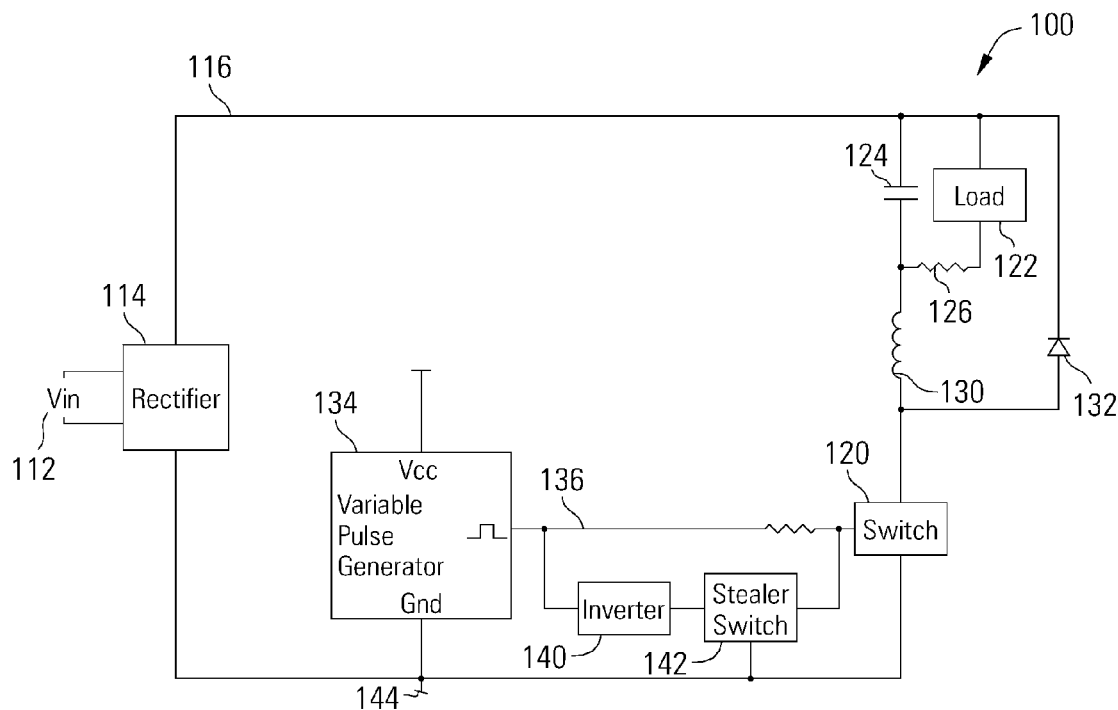
FIG. 2 depicts a schematic of a dimming driver with stealer switch in accordance with some embodiments of the invention.

Turning to FIG. 2, a schematic of an embodiment of a dimming driver with stealer switch 100 is illustrated in accordance with some embodiments of the invention. An AC input 112 is converted to a DC supply 116 by rectifier 114. As noted above, the dimming driver with stealer switch 100 is not limited to this particular example power configuration. A switch 120 controls current from DC supply 116 to a load 122. The load 122 is connected in parallel with, for example, a capacitor 124 which is optional in some embodiments of the present invention, with an optional load current sense resistor 126 connected in series with the load 122. An inductor 130 is connected in series with load 122 and capacitor 124 to store energy as current flows from DC supply 116 through the load 122, when the switch 120 is on. A diode 132 is connected to make a loop including load 122 and inductor 130, allowing energy stored in inductor 130 to produce a current through load 122 when switch 120 is off.

The switch 120 is controlled by pulses from a variable pulse generator 134, for example with the on-time and/or off-time of the pulses adjusted based on the current through the load 122 and/or the current through switch 120 to provide the desired load current and/or voltage. The output 136 of variable pulse generator 134 is also provided to inverter 140 and stealer switch 142. The stealer switch 142 pulls the control input of switch 120 down to ground 144 when the output 136 of variable pulse generator 134 is off, rapidly turning off switch 120.

Figure 3:
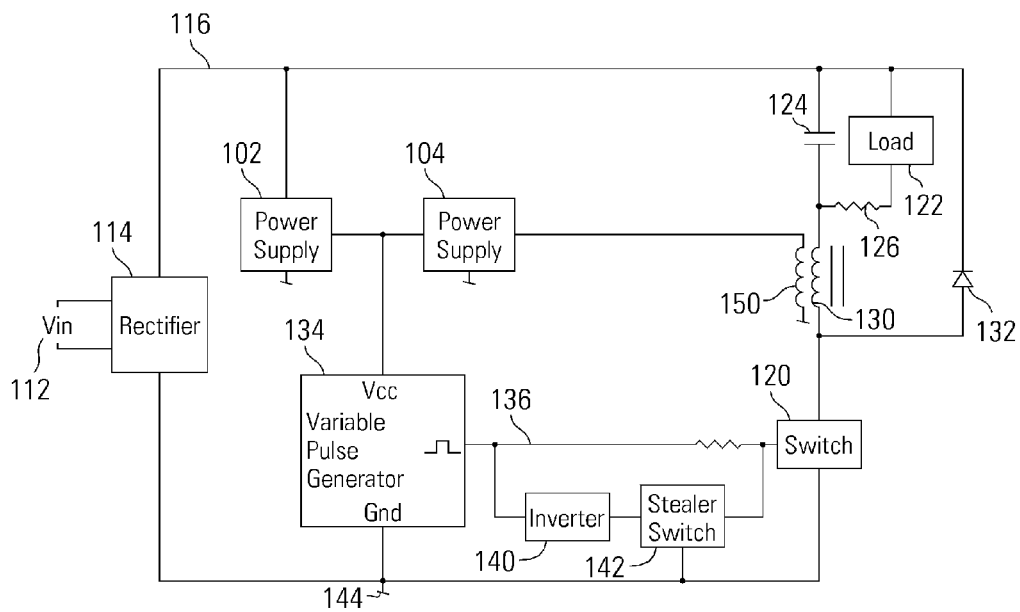
FIG. 3 depicts a schematic of a dimming driver with stealer switch wherein internal components derive power from a tag-along inductor in accordance with some embodiments of the invention.

Turning to FIG. 3, power for internal components may be drawn from a tag-along inductor 150 as described in U.S. Patent Application 61/558,512, filed Nov. 11, 2011 for a "Dimmable LED Driver with Multiple Power Sources", which is incorporated herein by reference for all purposes. The first power source 102 draws power from the DC rail 116, regulating or dividing or otherwise setting the voltage level at an appropriate level, for example, for the variable pulse generator 134. The second power source 104 draws power from an inductor 150 adjacent the main inductor 130, inductively coupling power flowing through the main inductor 130 into the power source 104.

Figure 4:
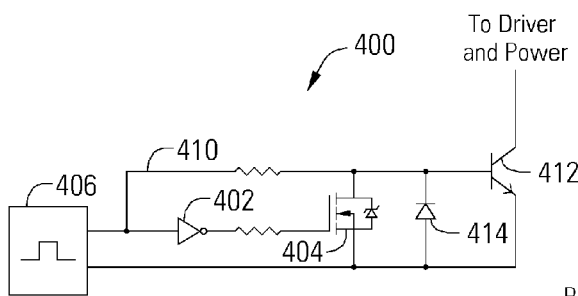
FIG. 4 depicts a portion of a dimming driver including an inverter and stealer switch in accordance with some embodiments of the invention.

Turning to FIG. 4, a portion of a dimming driver 400 with inverter 402 and stealer switch 404 are depicted in accordance with some embodiments of the invention. A variable pulse generator 406 produces a pulse signal 410 that drives the control input of main switch 412. Main switch 412 may correspond to switch 120 in the embodiments of FIGS. 2 and 3, and may comprise, for example, a bipolar junction transistor (BJT), with the base as control input connected to pulse signal 410. When the pulse signal 410 is on, the main switch 412 is on, allowing current to flow from a power input to a load. When the pulse signal 410 is off, the main switch 412 is off, blocking current from the power input and allowing current to circulate through the load in an internal loop in some embodiments, as disclosed above. When pulse signal 410 is off, inverter 402 turns on stealer switch 404, pulling the base of BJT main switch 412 down and rapidly turning off BJT 412. A diode 414 is connected between the base and emitter of main switch 412, allowing the base of main switch 412 to discharge when it is off.

Figure 5:
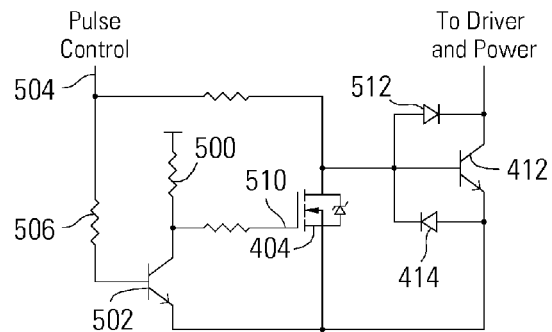
FIG. 5 depicts an inverter and stealer switch in accordance with some embodiments of the invention.

Turning to FIG. 5, an inverter and stealer switch are depicted in accordance with some embodiments of the invention. The inverter comprises a pull-up resistor 500 and pull-down BJT 502 connected in series and controlled by the pulse control signal 504 through resistor 506, although the inverter can be made from any type of circuit, topology, approach, etc. including but not limited to field effect transistors (FETs) including but not limited to MOSFETs, JFETs, NMOS, PMOS, CMOS, BiCMOS, DMOS, EMOS, BCD, etc. made from or based on any appropriate material including silicon (Si), silicon carbide (SiC), silicon germanium (SiGe), silicon on insulator (SOI), gallium arsenide (GaAs), indium phosphide (InP), gallium nitride (GaN), combinations of these, etc. along with any type and number of passive components, if needed. When pulse control signal 504 is on, pull-down BJT 502 is on, pulling the gate 510 (or, for example, base if a BJT is used) of stealer switch 404 down and turning it off. When pulse control signal 504 is off, pull-down BJT 502 is off, pulling the gate 510 of stealer switch 404 up through pull-up resistor 500 and turning stealer switch 404 on. A diode 414 is connected between the base and emitter of main switch 412, allowing and assisting the base of main switch 412 to discharge when it is off. A diode 512 is connected between the base and collector of main switch 412 as part of a Baker circuit or desaturation circuit and/or related circuits, keeping the main switch 412 out of deep saturation and $V_{BE} > V_{CE}$. Other elements of a Baker circuit can also be used and incorporated into the present invention. In addition, other Baker elements or desaturation circuits including additional diodes, capacitors, resistors, inductors, etc. can be used and incorporated into the present invention as well as protection circuits such as, for example, snubber, clamps, peak detectors, limiters, rate limiters, including current and voltage rate limiters, etc.

The inverter and stealer switch enable the use of a BJT 412 as the main switch in a dimming driver, greatly improving the reverse recovery time and efficiency and reducing switching loss.

Figure 6:
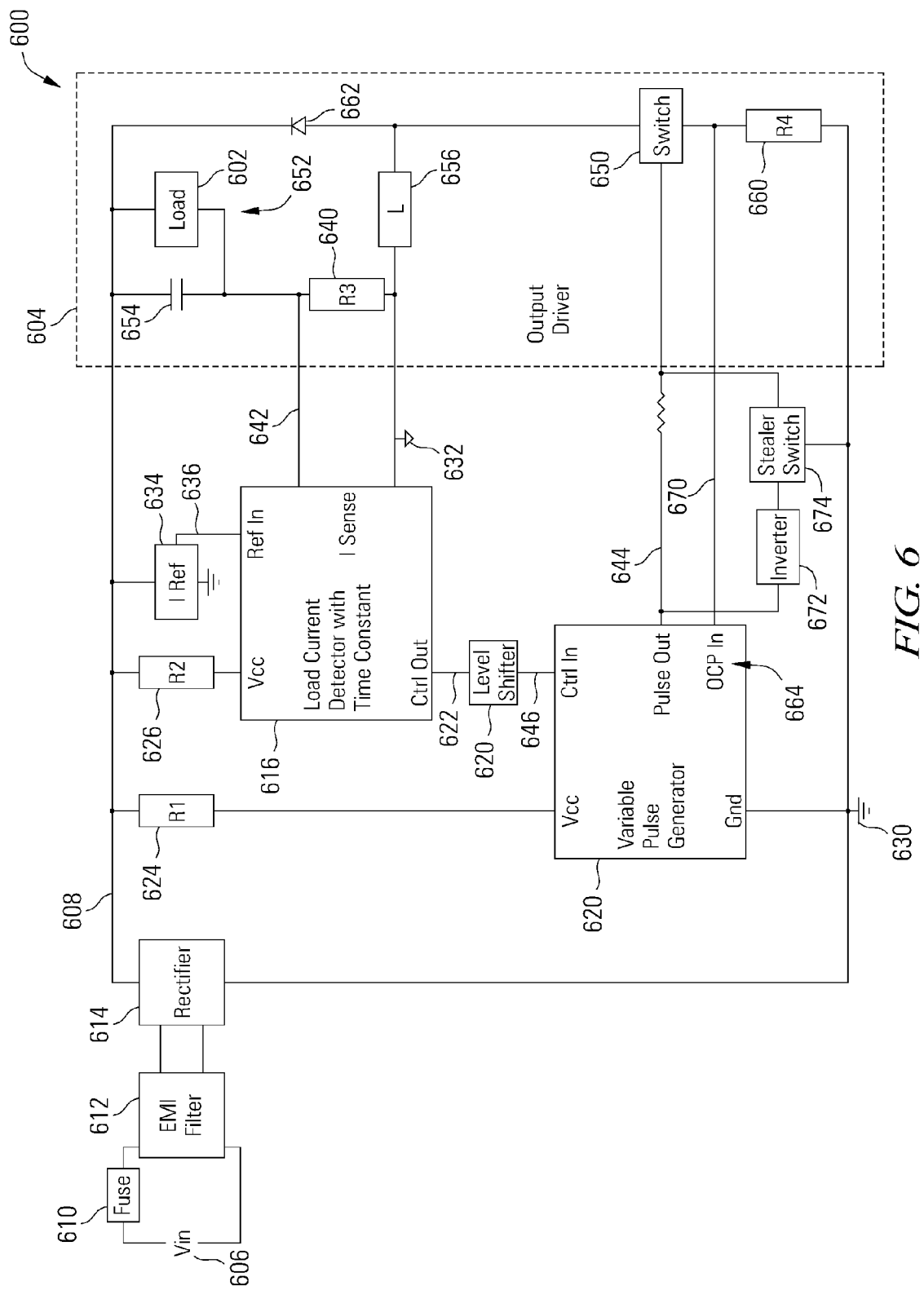
FIG. 6 depicts a block diagram of a dimming driver with stealer switch in accordance with some embodiments of the invention.

Turning to FIG. 6, a block diagram of a dimming driver with stealer switch 600 is depicted in accordance with some embodiments of the invention. In the diagram of FIG. 6, the load 602 is shown inside the output driver 604 for convenience in setting forth the connections in the diagram. The dimming driver with stealer switch 600 is powered from an AC input 606 through a fuse 610 and an electromagnetic interference (EMI) filter 612. A DC input may also be used. The fuse 610 may be any device suitable to protect the dimming driver with stealer switch 600 from overvoltage or overcurrent conditions, such as a traditional meltable fuse or other device (e.g., a small low power surface mount resistor), a breaker, etc. The EMI filter 612 may be any device suitable to prevent EMI from passing into or out of the dimming driver with stealer switch 600, such as a coil, inductor, capacitor and/or any combination of these, or, also in general, a filter, etc. The AC input 606 is rectified in a rectifier 614. In this embodiment, the dimming driver with stealer switch 600 may generally be divided into a high side portion including a load current detector 616 and a low side portion including a variable pulse generator 620, with the output driver 604 spanning or including the high and low side. In this case, a level shifter 620 may be employed between the load current detector 616 in the high side and the variable pulse generator 620 in the low side to communicate the control signal 622 to the variable pulse generator 620. The variable pulse generator 620 and load current detector 616 are both powered by the supply voltage 608 from the rectifier 614, for example through resistors 624 and 626, respectively, although they may alternatively be powered from a tag-along inductor as disclosed above or in any other manner. The high side, including the load current detector 616, floats at a high potential under the supply voltage 608 and above the circuit ground 630. A local ground 632 is thus established and used as a reference voltage by the load current detector 616.

A reference current source 634 supplies a reference current signal 636 to the load current detector 616, and a current sensor such as a resistor 640 provides a load current signal 642 to the load current detector 616. The reference current source 634 may use the circuit ground 630 as illustrated in FIG. 6, or the local ground 632, or both, or some other reference voltage level as desired. The load current detector 616 compares the reference current signal 636 with the load current signal 642 using a time constant to effectively average out and disregard current fluctuations due to any waveform at the input voltage 608 and pulses from the variable pulse generator 620, and generates the control signal 622 to the variable pulse generator 620. The variable pulse generator 620 adjusts the pulse width of a train of pulses at the pulse output 644 of the variable pulse generator 620 based on the level shifted control signal 646 from the load current detector 616. The level shifter 620 shifts the control signal 622 from the load current detector 616 which is referenced to the local ground 632 in the load current detector 616 to a level shifted control signal 646 that is referenced to the circuit ground 630 for use in the variable pulse generator 620. The level shifter 620 may comprise any suitable device for shifting the voltage of the control signal 622, such as an opto-isolator or opto-coupler, resistor, transformer, etc.

The pulse output 644 from the variable pulse generator 620 drives a switch 650 such as a BJT in the output driver 604. When a pulse from the variable pulse generator 620 is active, the switch 650 is turned on, drawing current from the input voltage 608, through the load path 652 (and an optional capacitor 654 connected in parallel with the load 602), through the load current sense resistor 640, an inductor 656 in the output driver 604, the switch 650, and a current sense resistor 660 to the circuit ground 630. When the pulse from the variable pulse generator 620 is off, the switch 650 is turned off, blocking the current from the input voltage 608 to the circuit ground 630. The inductor 656 resists the current change and recirculates current through a diode 662 in the output driver 604, through the load path 652 and load current sense resistor 640 and back to the inductor 656. The load path 652 is thus supplied with current alternately through the switch 650 when the pulse from the variable pulse generator 620 is on and with current driven by the inductor 656 when the pulse is off.

The pulses from the variable pulse generator 620 have a relatively much higher frequency than variations in the input voltage 608. Note that any suitable frequency for the pulses from the variable pulse generator 620 may be selected as desired, with the time constant in the load current detector 616 being selected accordingly to disregard load current changes due to the pulses from the variable pulse generator 620 while tracking changes on the input voltage 608 that are slower than or on the order of the waveform on the input voltage 608. Changes in the current through the load 602 due to the pulses from the variable pulse generator 620 may be smoothed in the optional capacitor 654, or may be ignored if the load is such that high frequency changes are acceptable. For example, if the load 602 is an LED or array of LEDs, any flicker that may occur due to pulses at many thousands of cycles per second will not be visible to the eye. In the embodiment of FIG. 6, a current overload protection 664 is included in the variable pulse generator 620 and is based on a current measurement signal 670 by the current sense resistor 660 connected in series with the switch 650. If the current through the switch 650 and the current sense resistor 660 exceeds a threshold value set in the current overload protection 664, the pulse width at the pulse output 644 of the variable pulse generator 620 will be reduced or eliminated. The present invention is shown implemented in the discontinuous mode; however with appropriate modifications operation under continuous or critical conduction modes or any other modes including resonant circuit modes can also be realized.

Efficiency is improved in the dimming driver 600 when switch 650 is a BJT by including inverter 672 and stealer switch 674 to rapidly discharge the base of the BJT used as switch 650 when the pulse signal from variable pulse generator 620 is off, as disclosed above.

Figure 7:
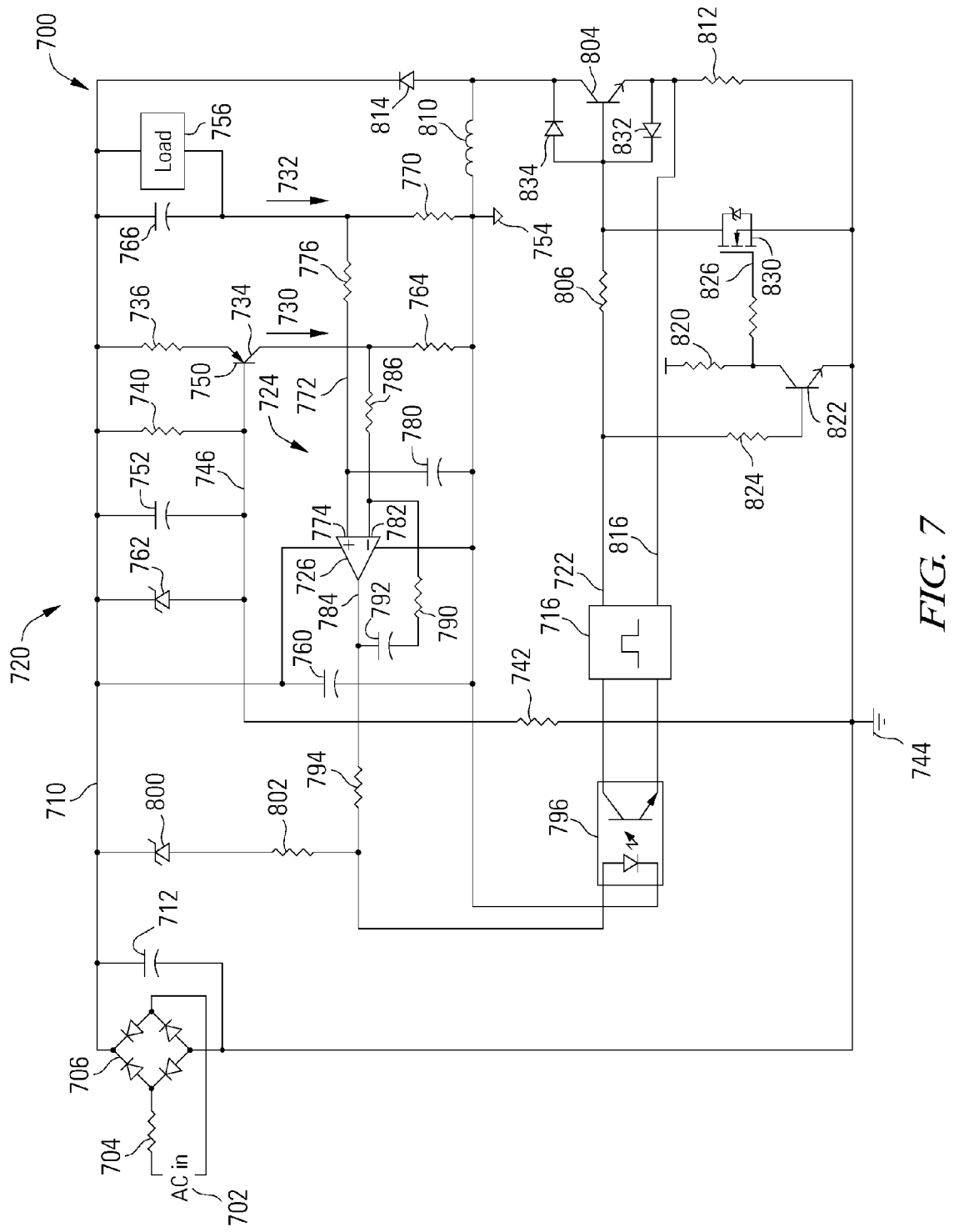
FIG. 7 depicts a schematic diagram of a dimming driver with stealer switch in accordance with some embodiments of the invention.

Turning to FIG. 7, a schematic diagram of a dimming driver with stealer switch 700 is depicted in accordance with some embodiments of the invention. Notably, a number of optional elements are included in the example dimming driver with stealer switch 700 that may be omitted without departing from the inventive concepts disclosed herein. The dimming driver with stealer switch 700 is powered from an AC input 702 through a resistor 704 used as a fuse, and a diode bridge as a rectifier 706. As disclosed above, other power sources may be used in other embodiments. Some smoothing of the voltage on the supply rail 710 may be provided by a capacitor 712, although it is not necessary as described above. Capacitor 712 is optional and may be eliminated or reduced to a small value and, as mentioned above, is included as desired and or needed, etc.

A variable pulse generator 716 generates pulses at the pulse output 722, with the pulse width varied by one or more feedback signals as disclosed below or in other manners. The pulses from variable pulse generator 716 may have any suitable shape, such as substantially square pulses, semi-sinusoidal, triangular, etc. although square or rectangular are perhaps most common in driving field effect transistors. The frequency of the pulses may also be set at any desired rate by a clock or multi-phase clock 714, such as, for example, 30 kHz or 100 kHz.

The width of the pulses may be controlled by load current detector 724, although a maximum width may be established if desired. The load current detector 724 includes an operational amplifier (op-amp) 726 acting as an error amplifier to compare a reference current 730 and a load current 732. The op-amp 726 may be embodied by any device suitable for comparing the reference current 726 and load current 732, including active devices and passive devices.

The reference current 726, for example, may be supplied by a transistor such as bipolar junction transistor (BJT) 734 connected in series with resistor 736 to the supply rail 710. Resistors 740 and 742 are connected in series between the supply rail 710 and the circuit ground 744, forming a voltage divider with a central node 746 connected to the base 750 of the BJT 734. The BJT 734 and resistor 736 act as a constant current source that is varied by the voltage on the central node 746 of the voltage divider 740 and 742, which is in turn dependent on the input voltage at supply rail 710. A capacitor 752 may be connected between the supply rail 710 and the central node 746 to form a time constant for voltage changes at the central node 746. The dimming driver with stealer switch 700 thus responds to the average voltage of supply rail 710 rather than the instantaneous voltage although the lighting driver can be designed to respond to the instantaneous voltage and/or both the instantaneous and average voltage or any combination, etc. Other embodiments can employ voltage dividers including simple resistive network voltage dividers, capacitive dividers and other active and passive networks, approaches, topologies, transistor types, circuits, electronics, etc.

In one particular embodiment, the local ground 754 floats at about 10 V below the supply rail 710 at a level established by the load 756. A capacitor 760 may be connected between the supply rail 710 and the local ground 754 to smooth the voltage powering the load current detector 724 if desired. A Zener diode 762 may also be connected between the supply rail 710 and the central node 746 to set a maximum load current 732 by clamping the reference current 730 that BJT 734 can provide to resistor 764. In other embodiments, the load current detector 724 may have its current reference derived by a simple resistive voltage divider, with suitable AC input voltage sensing, level shifting, and maximum clamp, rather than BJT 734.

The load current 732 (meaning, in this embodiment, the current through the load 756 and through the capacitor 766 connected in parallel with the load 756) is measured using the load current sense resistor 770 although any current sensing element, including but not limited to a transformer or winding on a transformer or inductor, may be used in place of or in addition to sense resistor 770. The current measurement 772 is provided to an input of the error amplifier 726, in this case, to the non-inverting input 774. A time constant is applied to the current measurement 772 using any suitable device, such as the RC lowpass filter made up of the series resistor 776 and the shunt capacitor 780 to the local ground 754 connected at the non-inverting input 774 of the error amplifier 726.

As discussed above, any suitable device for establishing the desired time constant may be used such that the load current detector 724 disregards rapid variations in the load current 732 due to the pulses from the variable pulse generator 716 and any regular waveform on the supply rail 710. The load current detector 724 thus substantially filters out changes in the load current 732 due to the pulses, averaging the load current 732 such that the load current detector output 784 is substantially unchanged by individual pulses at the variable pulse generator output 716.

The reference current 730 is measured using a sense resistor 764 connected between the BJT 734 and the local ground 754, and is provided to the inverting input 782 of the error amplifier 726. The error amplifier 726 is connected as a difference amplifier with negative feedback, amplifying the difference between the load current 732 and the reference current 730. An input resistor 786 is connected in series with the inverting input 782. A feedback resistor 790 is connected between the output 784 of the error amplifier 724 and the inverting input 782. A capacitor 792 is connected in series with the feedback resistor 790 between the output 784 of the error amplifier 724 and the inverting input 782. An output resistor 794 is connected in series with the output 784 of the error amplifier 724 to further establish a time constant in the load current detector 724. Again, the load current detector 724 may be implemented in any suitable manner to measure the difference of the load current 732 and reference current 730.

A level shifter 796, in this case, an opto-isolator, is connected to the output resistor 794 of the load current detector 724 to reference the output signal to the circuit ground 744 rather than the local ground 754. In other embodiments a level shifter and/or opto-isolator is not required. In other embodiments, a PNP transistor may be used.

A Zener diode 800 and series resistor 802 may be connected between the supply rail 710 and the output of output resistor 794 for overvoltage protection. Again, the above are merely example embodiments for illustrative purposes and not meant to be limiting in any way or form.

Pulses from the variable pulse generator 716 turn on a switch 804, in this case a BJT via a resistor 806 to the base of the switch 804. This allows current 732 to flow through the load 756 and capacitor 766, through the load current sense resistor 770, inductor 810, the switch 804 and a current sense resistor 812 to circuit ground 744. In between pulses, the switch 804 is turned off, and the energy stored in the inductor 810 (or, in other embodiments, a transformer) when the switch 804 was on is released to resist the change in current. The current from the inductor 810 then flows through diode 814 and back through the load 756 and load current sense resistor 770 to the inductor 810. Because of the time constant in the load current detector 724, the load current 732 monitored by the load current detector 724 is an average of the current through the switch 804 during pulses and the current through the diode 814 between pulses. Additional elements, for example, capacitors, base coil and/or inductor, additional resistors, etc. can be added in conjunction with resistor 806, for example in parallel or series with resistor 806; an example of which would be a capacitor in parallel with resistor 806.

The current through the channel 720 of the dimming driver with stealer switch 700 is monitored by the current sense resistor 812, with a current feedback signal 816 returning to the variable pulse generator 716. If the current exceeds a threshold value, the pulse width is reduced or the pulses are turned off in the variable pulse generator 716.

An inverter comprising a pull-up resistor 820 and pull-down BJT 822 connected in series is connected to the pulse output 722 through resistor 824. When pulse output 722 is on, pull-down BJT 822 is on, pulling the gate 826 (or base if, for example, a BJT is used) of stealer switch 830 down and turning it off. When pulse output 722 is off, pull-down BJT 822 is off, pulling the gate 826 of stealer switch 830 up through pull-up resistor 820 and turning stealer switch 830 on, rapidly discharging the base of switch 804. A diode 832 is connected between the base and emitter of BJT 804, allowing the base of BJT 804 to discharge when it is off. A diode 834 is connected between the base and collector of BJT 804 as part of a Baker circuit or desaturation circuit, keeping the BJT 804 out of deep saturation and $V_{BE} > V_{CE}$. Other types of inverters may be used including, but not limited to, CMOS, NPN-PNP inverters, BCD, BiCMOS, etc.

The inverter and stealer switch enable the use of a BJT 804 as the main switch in the dimming driver 700, greatly improving the reverse recovery time and efficiency and reducing switching loss.

The present invention can be used in high power factor (PF) circuits with or without dimming including triac, forward and reverse dimmers, 0 to 10 V dimming, powerline dimming, wireless and other wired dimming, DALI dimming, PWM dimming, DMX, etc., as well as any other dimming and control protocol, interface, standard, circuit, arrangement, hardware, etc.

The example embodiments disclosed herein illustrate certain features of the present invention and not limiting in any way, form or function of present invention. Note that linear or switching voltage or current regulators or any combination can be used in the present invention and other elements/components can be used in place of the diodes, etc. The present invention can also include passive and active components and circuits that assist, support, facilitate, etc. the operation and function of the present invention. Such components can include passive components such as resistors, capacitors, inductors, filters, transformers, diodes, other magnetics, combinations of these, etc. and active components such as switches, transistors, integrated circuits, including ASICs, microcontrollers, microprocessors, FPGAs, CLDs, programmable logic, digital and or analog circuits, and combinations of these, etc. and as also discussed below.

The present invention can be used in power supplies, drivers, ballasts, etc. with or needing high power factor (PF) and/or lower THD circuits with or without dimming including triac, forward and reverse dimmers, 0 to 10 V dimming, powerline dimming, wireless and other wired dimming, DALI dimming, PWM dimming, DMX, etc., as well as any other dimming and control protocol, interface, standard, circuit, arrangement, hardware, etc.

The present invention is, likewise, not limited in materials choices including semiconductor materials such as, but not limited to, silicon (Si), silicon carbide (SiC), silicon on insulator (SOI), other silicon combination and alloys such as silicon germanium (SiGe), etc., diamond, graphene, gallium nitride (GaN) and GaN-based materials, gallium arsenide (GaAs) and GaAs-based materials, etc. The present invention can include any type of switching elements including, but not limited to, field effect transistors (FETs) such as metal oxide semiconductor field effect transistors (MOSFETs) including either p-channel or n-channel MOSFETs, junction field effect transistors (JFETs), metal emitter semiconductor field effect transistors, etc. again, either p-channel or n-channel or both, bipolar junction transistors (BJTs), heterojunction bipolar transistors (HBTs), high electron mobility transistors (HEMTs), unijunction transistors, modulation doped field effect transistors (MODFETs), etc., again, in general, n-channel or p-channel or both, vacuum tubes including diodes, triodes, tetrodes, pentodes, etc. and any other type of switch, etc. The present invention can, for example, be used with continuous conduction mode (CCM), critical conduction mode (CRM), discontinuous conduction mode (DCM), etc., of operation with any type of circuit topology including but not limited to buck, boost, buck-boost, boost-buck, cuk, etc., SEPIC, flyback, etc. In addition, the present invention does not require any additional special isolation or the use of an isolated power supply, etc. The present invention applies to all types of power supplies and sources and the respective power supply(ies) can be of a constant frequency, variable frequency, constant on time, constant off time, variable on time, variable off time, etc. Other forms of sources of power including thermal, optical, solar, radiated, mechanical energy, vibrational energy, thermionic, etc. are also included under the present invention. The present invention may be implemented in various and numerous forms and types including those involving integrated circuits (ICs) and discrete components and/or both. The present invention may be incorporated, in part or whole, into an IC, etc. The present invention itself may also be non-isolated or isolated, for example using a tag-along inductor or transformer winding or other isolating techniques, including, but not limited to, transformers including signal, gate, isolation, etc. transformers, optoisolators, optocouplers, etc.

The present invention includes other implementations that contain various other control circuits including, but not limited to, linear, square, square-root, power-law, sine, cosine, other trigonometric functions, logarithmic, exponential, cubic, cube root, hyperbolic, etc. in addition to error, difference, summing, integrating, differentiators, etc. type of op amps. In addition, logic, including digital and Boolean logic such as AND, NOT (inverter), OR, Exclusive OR gates, etc., complex logic devices (CLDs), field programmable gate arrays (FPGAs), microcontrollers, microprocessors, application specific integrated circuits (ASICs), etc. can also be used either alone or in combinations including analog and digital combinations for the present invention. The present invention can be incorporated into an integrated circuit, be an integrated circuit, etc.

The present invention can also incorporate at an appropriate location or locations one or more thermistors (i.e., either of a negative temperature coefficient [NTC] or a positive temperature coefficient [PTC]) to provide temperature-based load current limiting. The present invention may provide thermal control or other types of control to, for example, a dimming LED driver. For example, the circuit of FIGS. 1 and 2 or variations thereof may also be adapted to provide overvoltage or overcurrent protection, short circuit protection for, for example, a dimming LED driver, or to override and cut the phase and power to the dimming LED driver(s) based on any arbitrary external signal(s) and/or stimulus. The present invention can also include circuit breakers including solid state circuit breakers and other devices, circuits, systems, etc. That limit or trip in the event of an overload condition/situation. The present invention can also include, for example analog or digital controls including but not limited to wired (i.e., 0 to 10 V, RS 232, RS485, IEEE standards, SPI, I2C, other serial and parallel standards and interfaces, etc.), wireless, powerline, etc. and can be implemented in any part of the circuit for the present invention. The present invention can be used with a buck, a buck-boost, a boost-buck and/or a boost, flyback, or forward-converter design etc., topology, implementation, etc.

Other embodiments can use comparators, other op amp configurations and circuits, including but not limited to error amplifiers, summing amplifiers, log amplifiers, integrating amplifiers, averaging amplifiers, differentiators and differentiating amplifiers, etc. and/or other digital and analog circuits, microcontrollers, microprocessors, complex logic devices, field programmable gate arrays, etc.

The present invention includes implementations that may contain various other control circuits including, but not limited to, linear, square, square-root, power-law, sine, cosine, other trigonometric functions, logarithmic, exponential, cubic, cube root, hyperbolic, etc. in addition to error, difference, summing, integrating, differentiators, etc. type of op amps. In addition, logic, including digital and Boolean logic such as AND, NOT (inverter), OR, Exclusive OR gates, etc., complex logic devices (CLDs), field programmable gate arrays (FPGAs), microcontrollers, microprocessors, application specific integrated circuits (ASICs), etc. can also be used either alone or in combinations including analog and digital combinations for the present invention. The present invention can be incorporated into an integrated circuit, be an integrated circuit, etc.

While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. An apparatus for supplying power, comprising:
   a power input;
   an output driver operable to transfer power from the power input to a load output;
   an output driver control switch operable to control a current from the power input through the output driver;
   a pulse generator operable to generate a pulse signal to control the output driver control switch; and
   a stealer switch operable to disable the pulse signal.

2. The apparatus of claim 1, wherein the stealer switch is operable to sink current from the pulse signal.

3. The apparatus of claim 1, wherein the stealer switch is controlled by the pulse signal.

4. The apparatus of claim 1, wherein the stealer switch comprises a transistor connected between the pulse signal and a ground.

5. The apparatus of claim 4, wherein a control input of the transistor is connected to the pulse signal.

6. The apparatus of claim 5, further comprising a resistor connected inline in the pulse signal between the pulse generator and the stealer switch.

7. The apparatus of claim 4, further comprising an inverter between the pulse signal and the control input of the transistor.

8. The apparatus of claim 7, further comprising a diode connected between the pulse signal and the ground.

9. The apparatus of claim 4, wherein the stealer switch comprises a field effect transistor.

10. The apparatus of claim 1, wherein the output driver control switch comprises a bipolar junction transistor.

11. The apparatus of claim 10, wherein the bipolar junction transistor comprises an NPN transistor, and further comprising a first diode having a cathode connected to a base of the bipolar junction transistor and an anode connected to an emitter of the bipolar junction transistor, and a second diode having an anode connected to the base of the bipolar junction transistor and a cathode connected to the collector of the bipolar junction transistor.

12. The apparatus of claim 1, wherein the pulse generator comprises a variable pulse generator.

13. The apparatus of claim 1, wherein the pulse generator is operable to draw power from both the power input and from a tagalong inductor positioned in proximity to an inductor in the output driver.

14. The apparatus of claim 1, wherein the output driver comprises an inductor connected in series with the output driver control switch, a resistor connected in series with the inductor, the load output connected in series with the resistor, and a capacitor connected in parallel with the resistor and the load output.

15. A method of supplying power, comprising:
    regulating current from a power input to an output driver using an output driver control switch;
    controlling the output driver control switch with a pulse signal from a pulse generator; and
    sinking current from the pulse signal with a stealer switch when the pulse signal is de-asserted.

16. The method of claim 15, further comprising activating the stealer switch when an inverted version of the pulse signal is asserted.

17. The method of claim 15, further comprising powering the pulse generator by drawing power from the output driver via inductive coupling.

18. The method of claim 17, further comprising varying a current through the output driver based on a dimming signal.

19. The method of claim 15, further comprising controlling the pulse generator to vary a pulse width of the pulse signal to regulate a current through the output driver.

20. The method of claim 19, wherein the pulse width is varied based at least in part on a load current through the output driver.

* * * * *